United States Patent
Gysling

(10) Patent No.: US 10,627,272 B2
(45) Date of Patent: Apr. 21, 2020

(54) METHOD AND APPARATUS FOR MONITORING MULTIPHASE FLUID FLOW

(71) Applicant: Expro Meters, Inc., Wallingford, CT (US)

(72) Inventor: Daniel L. Gysling, Glastonbury, CT (US)

(73) Assignee: Expro Meters, Inc., Wallingford, CT (US)

( * ) Notice: Subject to any disclaimer, the term of this patent is extended or adjusted under 35 U.S.C. 154(b) by 266 days.

(21) Appl. No.: 14/719,046

(22) Filed: May 21, 2015

(65) Prior Publication Data
US 2015/0253167 A1 Sep. 10, 2015

Related U.S. Application Data

(62) Division of application No. 13/390,288, filed as application No. PCT/US2010/045187 on Aug. 11, 2010, now Pat. No. 9,068,872.
(Continued)

(51) Int. Cl.

| | |
|---|---|
| *G06F 17/00* | (2019.01) |
| *G06F 19/00* | (2018.01) |
| *G01F 1/66* | (2006.01) |
| *G01F 1/74* | (2006.01) |
| *G16Z 99/00* | (2019.01) |
| *G01S 15/88* | (2006.01) |

(Continued)

(52) U.S. Cl.
CPC ............ *G01F 1/663* (2013.01); *G01F 1/7082* (2013.01); *G01F 1/74* (2013.01); *G01S 15/88* (2013.01); *G01F 1/66* (2013.01); *G01F 25/0007* (2013.01); *G06F 17/00* (2013.01); *G06F 19/00* (2013.01)

(58) Field of Classification Search
CPC . G01F 1/74; G01F 1/66; G01F 1/7082; G01F 1/34; G01F 1/8486; G01F 25/0007; G01F 1/663; G06F 17/00; G01S 15/88
USPC ...................................................... 702/45, 48
See application file for complete search history.

(56) References Cited

U.S. PATENT DOCUMENTS

| | | |
|---|---|---|
| 4,168,624 A | 9/1979 | Pichon |
| 5,633,470 A | 5/1997 | Song |
| | (Continued) | |

FOREIGN PATENT DOCUMENTS

WO 2008016697 2/2008

OTHER PUBLICATIONS

EP Search report for EP10808702.4 dated Nov. 27, 2017.

*Primary Examiner* — Andrew Schechter
*Assistant Examiner* — Lynda Dinh
(74) *Attorney, Agent, or Firm* — Getz Balich LLC

(57) ABSTRACT

A method of and apparatus for monitoring fluid flow passing within a pipe is provided. The method includes the steps of: a) providing a flow pressure value and a flow temperature value for the fluid flow within the pipe; b) providing a fluid flowmeter operable to be attached to an exterior of the pipe; c) providing one or more of an additional flow related measurement (e.g., DP, SOS, etc.); d) providing a processor adapted to include an equation of state model for the pressure, volume, and temperature properties for the fluid flow, and further adapted to receive composition data values for the fluid flow, the flow pressure value, and the flow temperature value, and the flow velocity signals from the flowmeter; and e) determining a volumetric flow rate of one or more phases of the fluid flow.

6 Claims, 7 Drawing Sheets

Related U.S. Application Data

(60) Provisional application No. 61/233,016, filed on Aug. 11, 2009, provisional application No. 61/243,371, filed on Sep. 17, 2009.

(51) Int. Cl.
*G01F 1/708* (2006.01)
*G01F 25/00* (2006.01)

(56) References Cited

U.S. PATENT DOCUMENTS

| | | |
|---|---|---|
| 6,467,358 B1 | 10/2002 | Nishi et al. |
| 6,813,962 B2 | 11/2004 | Gysling et al. |
| 6,898,541 B2 | 5/2005 | Gysling et al. |
| 7,096,719 B2 | 8/2006 | Gysling |
| 7,328,624 B2 | 2/2008 | Gysling et al. |
| 7,389,187 B2 | 6/2008 | Kersey et al. |
| 7,400,985 B2 | 7/2008 | Fernald et al. |
| 7,401,530 B2 | 7/2008 | Johansen |
| 8,452,551 B2 | 5/2013 | Gysling |
| 2002/0123852 A1 | 9/2002 | Gysling et al. |
| 2004/0255695 A1 | 12/2004 | Gysling et al. |
| 2007/0006727 A1* | 1/2007 | Gysling ............... G01F 1/36 95/1 |
| 2007/0067116 A1 | 3/2007 | Rothman et al. |
| 2007/0157737 A1 | 7/2007 | Gysling et al. |
| 2008/0000306 A1* | 1/2008 | Agar ................... G01F 1/50 73/861.04 |
| 2008/0066559 A1 | 3/2008 | Johansen et al. |
| 2008/0236298 A1 | 10/2008 | Gysling |
| 2009/0308601 A1 | 12/2009 | Poe et al. |
| 2010/0305882 A1 | 12/2010 | Gysling |

\* cited by examiner

| Comp | Comp1 | Comp2 | Comp3 | Comp3 |
|---|---|---|---|---|
| N2 | 0.60 | 11.71 | 0.58 | 0.00 |
| CO2 | 3.34 | 6.50 | 3.27 | 0.00 |
| H2S | 0.00 | 0.05 | 0.00 | 0.00 |
| C1 | 74.16 | 79.06 | 53.89 | 52.00 |
| C2 | 7.90 | 1.62 | 8.57 | 3.81 |
| C3 | 4.15 | 0.35 | 6.05 | 2.37 |
| iC4 | 0.71 | 0.08 | 1.05 | 0.76 |
| nC4 | 1.44 | 0.10 | 2.44 | 0.96 |
| iC5 | 0.53 | 0.04 | 0.88 | 0.69 |
| nC5 | 0.66 | 0.04 | 1.17 | 0.51 |
| C6 | 0.81 | 0.06 | 1.45 | 2.06 |
| C7 | 1.20 | 0.06 | 2.38 | 2.63 |
| C8 | 1.15 | 0.05 | 2.59 | 2.34 |
| C9 | 0.63 | 0.04 | 1.75 | 2.35 |
| C10 | 0.50 | 0.24 $^{(+)}195$ | 1.50 | 29.52 $^{(+)}221$ |
| C11 | 0.29 | | 1.55 | |
| C12 | 0.27 | | 0.93 | |
| C13 | 0.28 | | 1.13 | |
| C14 | 0.22 | | 1.01 | |
| C15 | 0.17 | | 0.80 | |
| C16 | 0.15 | | 0.86 | |
| C17 | 0.14 | | 0.60 | |
| C18 | 0.09 | | 0.68 | |
| C19 | 0.13 | | 0.54 | |
| C20 | 0.47 $^{(+)}362$ | | 4.34 $^{(+)}411$ | |

*FIG. 1*

METHOD AND APPARATUS FOR MONITORING MULTIPHASE FLUID FLOW

CROSS-REFERENCE TO RELATED PATENT APPLICATIONS

This application is a divisional of U.S. patent application Ser. No. 13/390,288 filed Apr. 24, 2012, which claims priority to PCT Patent Appln. No. PCT/US2010/045187 filed Aug. 11, 2010, which claims the benefit of U.S. Provisional Patent Application No. 61/233,016 filed Aug. 11, 2009, and U.S. Provisional Application No. 61/243,371, filed Sep. 17, 2009, each of which are incorporated by reference herein in its entirety.

BACKGROUND OF THE INVENTION

1. Technical Field

The present invention relates to methods and apparatuses for monitoring fluid flow within a conduit (e.g., a pipe) in general, and to monitoring the multiphase fluid flow within a conduit in particular.

2. Background Information

The ability to measure multiphase fluid flows that vary in composition is desirable, particularly in the oil and gas industry. The ability to accurately measure wet gas flows is important for a wide range of upstream oil and gas applications. While measuring dry gas flow rates with intrusive devices is well-served by a wide range of gas flow metering technologies, accurate and cost-effective measurement of wet gas flow remains a long-standing challenge for the upstream oil and gas industry.

SUMMARY OF THE INVENTION

According to an aspect of the present invention, a method of monitoring fluid flow passing within a pipe, which fluid flow includes a gas phase and a liquid phase, is provided. The method includes the steps of: a) providing a flow pressure value and a flow temperature value for the fluid flow within the pipe; b) providing a fluid flowmeter operable to be attached to an exterior of the pipe, the flowmeter including a spatial array of at least two sensors disposed at different axial positions along the pipe, which flowmeter is adapted to produce flow velocity signals indicative of a velocity of the fluid flow traveling within the pipe; c) providing a processor adapted to include an equation of state model for the pressure, volume, and temperature properties for the multiphase fluid flow, and further adapted to receive composition data values for the multiphase fluid flow, the flow pressure value, and the flow temperature value, and the flow velocity signals from the flowmeter; and d) determining a volumetric flow rate of one or both the gas phase and liquid phase of the fluid flow.

According to another aspect of the present invention, a method of monitoring multiphase fluid flow passing within a pipe is provided. The method includes the steps of: a) providing a flow pressure value and a flow temperature value for the multiphase fluid flow within the pipe; b) providing a fluid flowmeter operable to be attached to an exterior of the pipe, which flowmeter is adapted to produce flow velocity signals; c) providing a speed of sound sensor operable to measure a speed of sound value for the fluid flow; and d) determining a volumetric flow rate of one or both a gas phase and a liquid phase of the fluid flow using a processor adapted with an equation of state model for the multiphase fluid flow to calculate a speed of sound value for the fluid flow given the flow pressure and temperature values, and adapted to compare a measured speed of sound value and a calculated speed of sound value to determine an error value, and adapted to determine whether the error value satisfies a predetermined condition, and if the condition is not met, the processor is adapted to iteratively determine an updated error value using an adjusted calculated speed of sound value, until the updated error value satisfies the predetermined condition.

According to an aspect of the present invention, a method of monitoring a single phase fluid flow passing within a pipe is provided. The method includes the steps of: a) providing a flow pressure value and a flow temperature value for the fluid flow within the pipe; b) determining a momentum value for the fluid flow using a DP meter; c) determining a velocity value of the fluid flow using a SONAR fluid flow meter; d) determining a measured density value of the fluid flow using the determined momentum value and the determined velocity value; and e) determining a volumetric flow rate of the fluid flow using a processor adapted with an equation of state model for the fluid flow to calculate a density value for the fluid flow given the flow pressure and temperature values, and adapted to compare the measured density value and the calculated density value to determine an error value, and adapted to determine whether the error value satisfies a predetermined condition, and if the condition is not met, the processor is adapted to iteratively determine an updated error value using an adjusted calculated density value, until the updated error value satisfies the predetermined condition.

According to another aspect of the present invention, an apparatus for monitoring a fluid flow passing within a pipe is provided. The apparatus includes a fluid flowmeter, a speed of sound sensor, and a processor. The fluid flowmeter is operable to be attached to an exterior of the pipe, and includes a spatial array of at least two sensors disposed at different axial positions along the pipe. The flowmeter is adapted to produce flow velocity signals indicative of a velocity of the fluid flow traveling within the pipe. The speed of sound sensor is operable to measure a speed of sound value for the fluid flow. The processor is adapted with an equation of state model for the multiphase fluid flow to calculate a speed of sound value for the fluid flow given a flow pressure value and a flow temperature value. The processor is further adapted to compare a measured speed of sound value and the calculated speed of sound value to determine an error value. The processor is further adapted to determine whether the error value satisfies a predetermined condition, and if the condition is not met, the processor is adapted to iteratively determine an updated error value using an adjusted calculated speed of sound value, until the updated error value satisfies the predetermined condition.

According to an aspect of the present invention, an apparatus for monitoring a single phase fluid flow passing within a pipe is provided. The apparatus includes a DP meter, a SONAR fluid flow meter, and a processor. The DP meter is operable to determine a momentum value for the fluid flow. The SONAR fluid flow meter is operable to determine a velocity value of the fluid flow. The processor is adapted to determine a measured density value of the fluid flow using a determined momentum value and a determined velocity value. The processor is further adapted with an equation of state model for the fluid flow to calculate a density value for the fluid flow given fluid flow pressure and temperature values, and adapted to compare a measured density value and a calculated density value to determine an error value. The processor is further adapted to determine whether the error value satisfies a predetermined condition, and if the condition is not met, the processor is adapted to iteratively determine an updated error value using an adjusted calculated density value, until the updated error value satisfies the predetermined condition.

The foregoing and other objects, features and advantages of the present invention will become more apparent in light of the following drawings and detailed description of the present invention.

BRIEF DESCRIPTION OF THE DRAWINGS

Referring now to the drawings, the foregoing and other features and advantages of the present invention will be more fully understood from the following detailed description of illustrative embodiments, taken in conjunction with the accompanying drawings in which like elements are numbered alike:

FIG. 1 is a table containing exemplary values for a number of hydrocarbon flow compositions, listing the various constituents mole percentages.

DETAILED DESCRIPTION OF THE INVENTION

The present invention provides a method and apparatus for monitoring multiphase fluid flow within a pipe. The term "pipe" is used herein to refer to any conduit operable to contain a fluid flow, and is not limited to circular piping. Multiphase fluid flows (including a gas phase and one or more liquid phases) are common in commercial applications. Perhaps one of the best known multiphase flow applications can be found in the gas and oil industry, where well head fluid flows commonly contain both gas and hydrocarbon liquids, as well as water. The hydrocarbon liquids emanating from the well are almost always a composition of a variety of hydrocarbon constituents. FIG. 1, for example, contains a table of exemplary hydrocarbon flow compositions, listing the various constituents' mole percentages. One of the challenges of multiphase flow measurement is that the composition of a given flow is often not known, and even if known, it can vary over time. As will be described below, embodiments of the present invention permit the determination of volumetric flow rates of the different phases of the multiphase flow.

Figure 2:
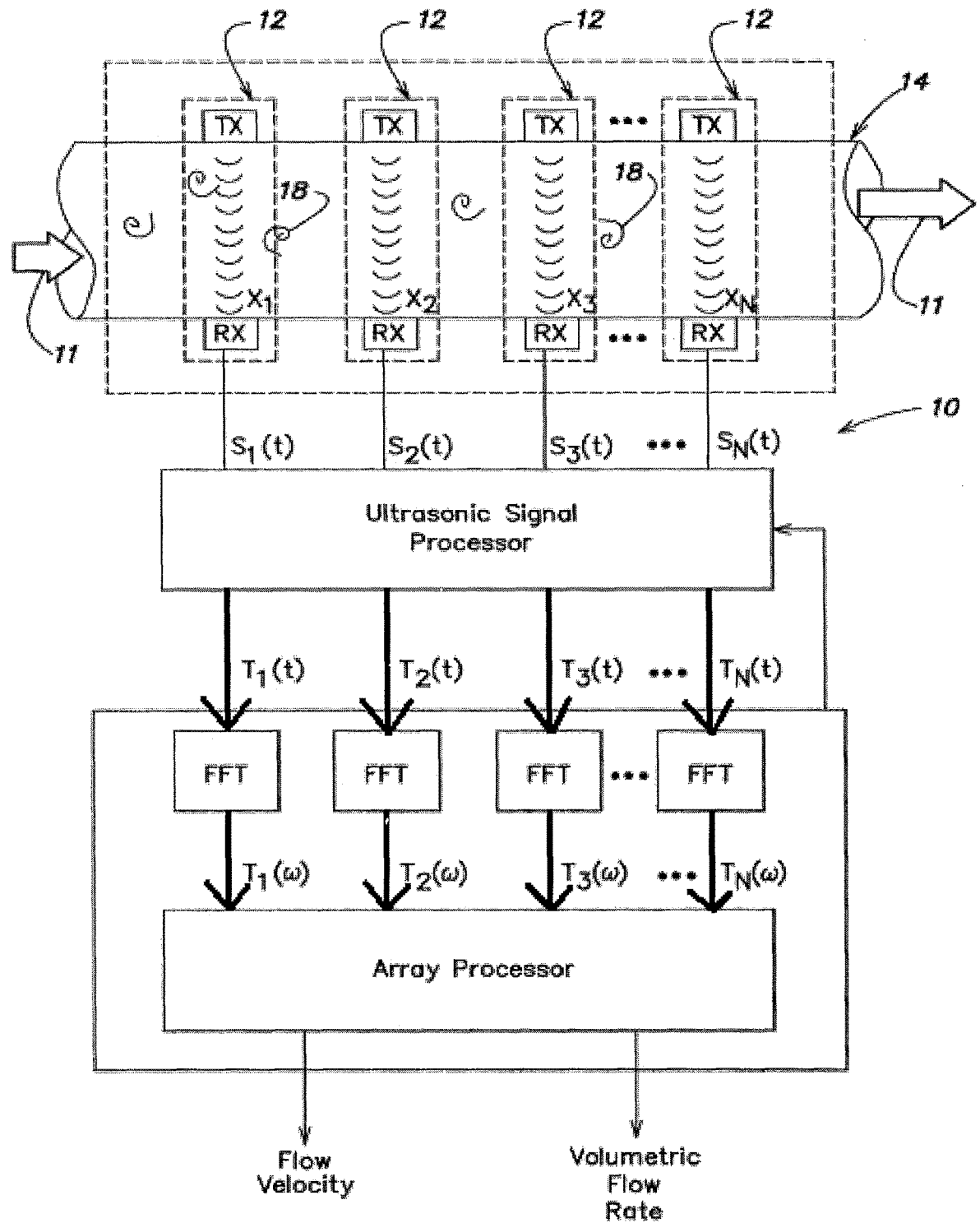
FIG. 2 is a diagrammatic illustration of a fluid flowmeter.

Now referring to FIG. 2, the present invention utilizes a SONAR-type flowmeter 10 that includes a spatial array of at least two sensors 12 disposed at different axial positions ($x_1$, $x_2$, ... $x_n$) along a pipe 14. Each of the sensors 12 provides a signal indicative of a characteristic of the flow 11 passing through the pipe 14. The signals from the sensors 12 are sent to a processor where they are processed to determine the velocity of the flow 11 passing within the pipe 14 by the sensor array. The volumetric flow 11 can then be determined by multiplying the velocity of the fluid by the cross-sectional area of the pipe 14.

U.S. Pat. No. 7,389,187, which is hereby incorporated by reference in its entirety, discloses a SONAR flowmeter 10 that can be used with the present invention. The flowmeter 10, diagrammatically illustrated in FIG. 2, includes an array of ultrasonic sensors 12, each of which sensors include a transmitter (Tx) and a receiver (Rx) typically positioned orthogonally across from one another on opposite sides of the pipe 14. Each sensor 12 measures the transit time of an ultrasonic signal (sometimes referred to as "time of flight" or "TOF") passing from the transmitter to the receiver. The TOF measurement is influenced by coherent properties that convect within the flow 11 within the pipe 14 (e.g., vortical disturbances 18, bubbles, particles, etc.). These convective properties, which convect with the flow 11, are in turn indicative of the velocity of the flow 11 within the pipe 14. The effect of the vortical disturbances 18 (and/or other inhomogenities within the fluid) on the TOF of the ultrasonic signal is to delay or speed up the transit time, and particular vortical disturbances 18 can be tracked between sensors.

An ultrasonic signal processor is used to coordinate the transmission of signals from the transmitters and the receipt of signals from the receivers ($S_1(t)$-$S_N(t)$). The signal processor processes the data from each of the sensors 12 to provide an analog or digital output signal ($T_1(t)$-$T_N(t)$) indicative of the TOF of the ultrasonic signal through the fluid. The output signals ($T_1(t)$-$T_N(t)$) from the ultrasonic signal processor are provided to another processor (e.g., an array processor), which processes the transit time data to determine flow parameters such as flow velocity and volumetric flow rate. The SONAR flowmeter 10 described in U.S. Pat. No. 7,389,187, and diagrammatically shown here in FIG. 2, represents an example of a flowmeter that can be used with the present invention. The present invention is not limited to this particular flowmeter embodiment, however.

Figure 3:
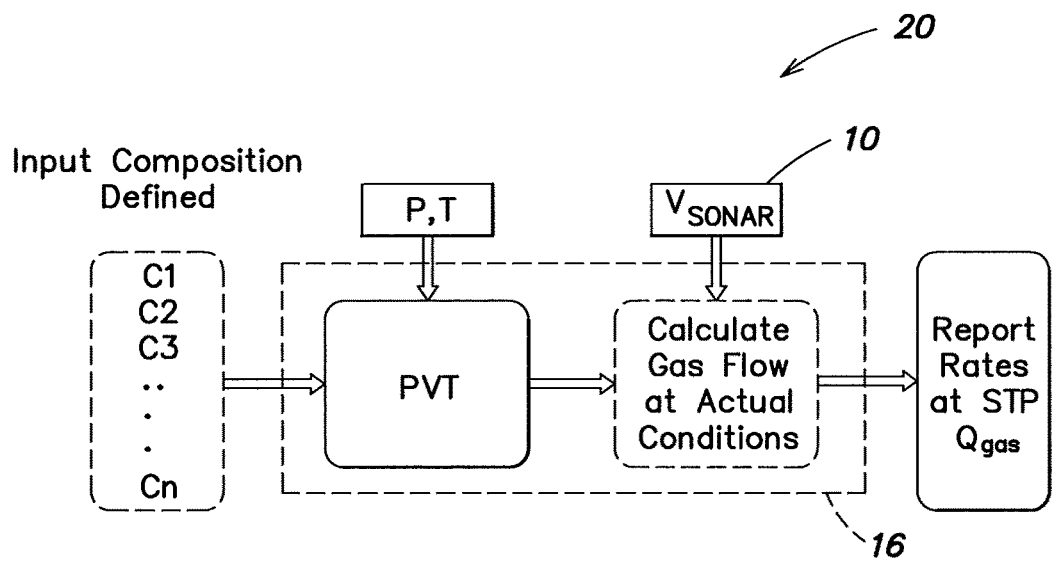
FIG. 3 is a block diagram that diagrammatically illustrates a flow chart of the input, operation, and output of an embodiment of the present invention monitoring system and method.

Now referring to FIG. 3, in a first embodiment of the present invention, a system 20 for monitoring a multiphase fluid flow 11 is provided that utilizes a SONAR flowmeter 10 and a processor 16, the latter adapted to include an equation of state model for the pressure, volume, and temperature properties for the multiphase hydrocarbon fluid flow 11 being evaluated. The aforesaid first embodiment of the system 20 may also be described in terms of a method for monitoring a multiphase fluid flow 11. FIG. 3 diagrammatically illustrates a flow chart of the input, operation, and output of the first embodiment of the system 20. The equation of state model is typically referred to as a "PVT Model". PVT Models are commercially available. An example of a PVT Model that can be used is the "PVTsim" model produced by Calsep A/S of Lyngby, Denmark. The processor 16 is further adapted to receive: 1) composition data representative of the well bore fluid flow 11 (i.e., "fluid flow composition values"); 2) flow pressure data (e.g., a flow pressure value from a pressure sensor; i.e., "P"); 3) flow temperature data (e.g., a flow temperature value from a temperature sensor; i.e., "T"); and 4) flow velocity data from the SONAR flowmeter 10 ("$V_{SONAR}$"). The fluid flow composition values are listed as "C1, C2, C3, ... Cn" to illustrate a hydrocarbon flow that includes a plurality of hydrocarbon components, other non-hydrocarbon components, and possibly a water component. The components used in the compositions as used herein are not limited to any particular number of hydrocarbon components, and can parameterized in a variety of ways that are representative of the fluid flow. Indeed, in terms of gas and oil applications, different wells will very often have different compositions, and those compositions may also vary over time. Using the pressure and temperature values, the flow velocity determined from the flowmeter 10, and the PVT Model, the processor 16 is adapted to determine the volumetric flow rates of one or both the gas and liquid phases of the fluid flow 11 at one or both of the actual temperature and pressure or a standard temperature and pressure (e.g., ambient temperature and pressure). As a specific example, given the input of a composition data value set, flow pressure data, and flow temperature data, the PVT Model can produce a gas density value ("$\rho_{gas}$"), which can be used with the $V_{SONAR}$ value to determine the gas volume flow rate ("$Q_{gas}$") at actual conditions. Once the $Q_{gas}$ value at actual conditions is known, it can be converted to the gas volume flow rate at standard temperature and pressure ("STP") values. An initial value set for the fluid flow composition values can be based on historical data, empirical testing, etc. The composition values can be adjusted as necessary to increase the accuracy of the values relative to the actual flow 11.

The processor 16 that is adapted to accept and produce the aforesaid inputs and outputs, respectively, may be a microprocessor, a personal computer, or other general purpose computer, or any type of analog or digital signal processing device adapted to execute programmed instructions. Further, it should be appreciated that some or all of the functions associated with the flow logic of the present invention may be implemented in software (using a microprocessor or computer) and/or firmware, or may be implemented using analog and/or digital hardware, having sufficient memory, interfaces, and capacity to perform the functions described herein.

Figure 4:
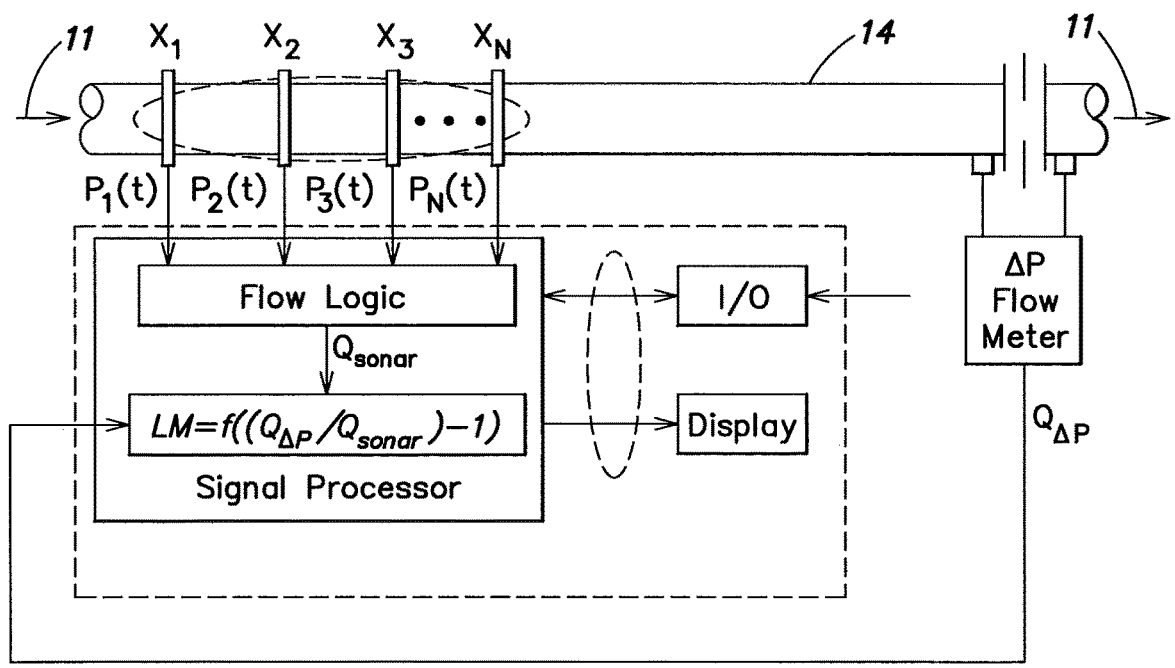
FIG. 4 is a diagrammatic illustration of a SONAR fluid flowmeter disposed in cooperation with a DP fluid flow meter.
Figure 5:
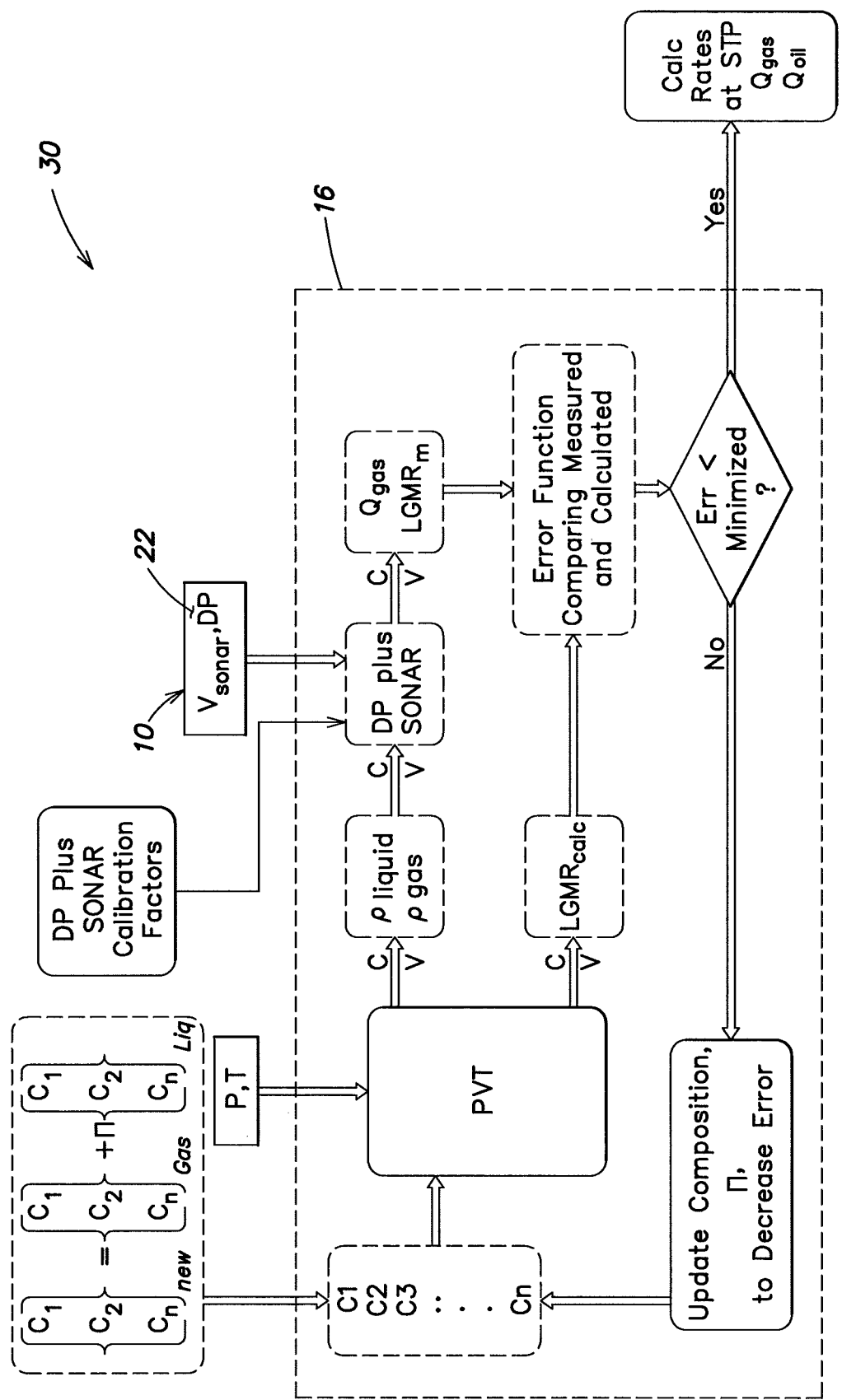
FIG. 5 is a block diagram that diagrammatically illustrates a flow chart of the input, operation, and output of an embodiment of the present invention monitoring system and method.

Now referring to FIGS. 4 and 5, in a second embodiment of the present invention, a system 30 (see FIG. 5) for monitoring a multiphase fluid flow 11 is provided that utilizes a SONAR flowmeter 10 as described above. The aforesaid system 30 may also be described in terms of a method for monitoring a multiphase fluid flow 11. In addition, this embodiment further includes a differential pressure-based flow meter 22, commonly referred to as a "DP flowmeter". DP flowmeters 22 can be used to monitor gas production and are well-known to over-report the gas flow rate of a multiphase fluid flow 11 in the presence of liquids within the multiphase flow 11. The tendency of a DP flowmeter 22 to over report due to wetness indicates a strong correlation with the liquid to gas mass ratio of the flow 11. As used herein, the term "DP flowmeter" refers to a device that is operable to determine a pressure drop of a flow of fluid, or gas, or mixture thereof, traveling within a pipe 14 across a constriction within that pipe 14, or through a flow length of pipe 14. Examples of DP flowmeters 22 that utilize a constriction include, but are not limited to, venturi, orifice, elbow, V-cone, and wedge type flowmeters.

This embodiment of the present invention utilizes both a SONAR flowmeter 10 and a DP flowmeter 22 to leverage the fact that SONAR flowmeters 10 and DP flowmeters 22 report gas flow rates differently in the presence of liquids within a multiphase flow 11. Specifically, although both SONAR flowmeters 10 and DP flowmeters 22 both "over report" the gas volume flow rate when liquid is present within a multiphase flow (i.e., a "wet gas flow"), the over report by the SONAR flowmeter 10 is substantially less than that of the DP flowmeter for most liquid loadings. The relative insensitivity of the SONAR flowmeter 10 to "wetness" within the flow 11 provides a practical means for accurately measuring the gas flow rate and the liquid flow rate of a wet gas flow 11. In the processing of the combined data (i.e. data obtained from the DP flowmeter 22 and the SONAR flowmeter 10), a set of local wetness sensitivity coefficients can be used to provide a more accurate characterization for both the DP flowmeter 22 and the SONAR flowmeter 10 to determine wetness. The wetness sensitivity coefficients for each device may be provided by a low order polynomial fit of the over-report vs. wetness. This characterization may then be used to "invert" the outputs of the DP flowmeter 22 and the SONAR flowmeter 10 to provide an accurate gas flow rate and an accurate liquid flow rate. The use of a SONAR flowmeter 10 and a DP flowmeter 22 in concert to accurately determine the liquid and gas flow rates of a multiphase fluid flow 11 is described in detail in U.S. Patent Publication No. 2008/0236298 (hereinafter referred to as "the '298 Publication"), which is hereby incorporated by reference herein its entirety. For example, the '298 Publication describes that the volumetric flow rate through a SONAR flowmeter 10 can be expressed as: $Q_{SONAR}=(1+\alpha MR)Q_{gas}$ and flow rate through a DP flowmeter 22 can be expressed as: $Q_{venturi}=(1+\beta MR+\chi MR^2)Q_{gas}$, where $\alpha$, $\beta$, and $\chi$ are empirically determined wetness sensitivity coefficients, MR is the liquid to gas mass ratio, and $Q_{gas}$ is the volumetric flow rate of the gas phase of the fluid flow. An example of how such coefficients can be determined empirically involves determining wetness sensitivity coefficients for the flow meters deployed on a plurality varying, but known flow conditions, and then determining the coefficients by fit from the test results. These equations represent examples of how wetness sensitivity coefficients may be determined, and the present invention is not limited to these particular embodiments. FIG. 4 diagrammatically illustrates a flow metering arrangement that utilizes a SONAR flowmeter 10 operating in concert with a DP flowmeter 22, both of which provide signals to the processor 16 that is adapted to output gas and liquid flow rates for a multiphase fluid flow 11.

In the second embodiment 30 of the system, which is diagrammatically illustrated in FIG. 5, the processor 16 is adapted to receive: 1) a set of fluid flow composition values (C1, C2, ... Cn); 2) flow pressure data (e.g., a flow pressure value from a pressure sensor; "P"); 3) flow temperature data (e.g., a flow temperature value from a temperature sensor; "T"); 4) flow velocity data from the SONAR flow meter ($V_{SONAR}$); and 5) flow velocity data from the DP flowmeter ("DP"). In some embodiments, the processor 16 also receives calibration data such as wetness sensitivity coefficients for one or both flowmeters 10,22. With the received inputs from the flowmeters 10,22, the processor 16 calculates a fluid flow parameter value; e.g., a liquid gas mass ratio (LGMR). This fluid flow parameter reflects a "measured" value based on the fact that the data used to calculate the value is taken from the flowmeters 10,22 measuring the actual fluid flow 11. The processor 16 also determines a "calculated" value for the fluid flow parameter (e.g., a "calculated" LGMR) based on the PVT model, given the input pressure and temperature values. The calculated fluid flow parameter value is then compared to the measured fluid flow parameter value and an error function evaluates any difference between the values. If the error value is within an acceptable range of values or greater/less than a threshold value (either of which may be described as "satisfying a predetermined condition"), one or more phase flow rates based on either calculated or measured values are determined and reported. If the flow rates are determined at temperature and pressure values other than standard values, the processor 16 is adapted to flash those flow rate values to analogous values at a predetermined standard temperature and pressure (STP).

If the error value is outside the acceptable range of values or less/greater than a threshold value (i.e., does not satisfy the predetermined condition), the processor 16 is adapted to produce a modified set of fluid flow composition values based on the initial set of fluid flow composition values, and iteratively repeat the above-described process using the modified values. The modification of the fluid flow composition values can be performed using a variety of different functions. An example of a function that can be used is as follows:

$$\begin{Bmatrix} c_1 \\ c_2 \\ c_n \end{Bmatrix}_{new} = \begin{Bmatrix} c_1 \\ c_2 \\ c_n \end{Bmatrix}_{gas} + \Pi \begin{Bmatrix} c_1 \\ c_2 \\ c_n \end{Bmatrix}_{liq} \quad \text{(Eqn. 1)}$$

where "$\Pi$" is a variable that is a function of the gas/oil ratio ("$f(GOR)$") of the composition, and which variable can be iteratively adjusted to improve the agreement between the measured values and the calculated values. An example of a "$f(GOR)$" variable is:

$$\gamma \frac{\# \, molesLiquid}{\# \, molesGas}$$

where "$\gamma$" is a variable that can be iteratively adjusted, and the number of moles of liquid and gas for the flow 11 are determined for a particular pressure and temperature. The processor 16 is adapted to iteratively repeat the process until the error function is satisfied and the flow rates are reported.

As indicated above, the fluid flow can be parameterized in a variety of different ways. Equation 1 above parameterizes the fluid flow in terms of fluid composition values, and in particular two separate groups of values; i.e., those associated with gaseous hydrocarbon components and associated with liquid hydrocarbon components. The present invention is not limited to this particular parameterization. As another example, a fluid flow having only "n" number of hydrocarbon components could be evaluated using a parameterization limited to those "n" components.

The above description identifies LGMR as an example of a fluid flow parameter that can be both calculated and measured to permit the above described comparison. The present invention is not limited to using LGMR as the fluid flow parameter, and other fluid flow parameters (e.g., the Lockhardt Martinelli (LM) number) can be used alternatively. The density of the fluid flow is another example of a fluid flow parameter that can be both calculated and measured to permit the above described comparison. For example, in some applications the fluid flow from a well is in the form of a single phase fluid that is referred to as the "dense phase". In this phase, only the single phase is present at a given pressure and temperature, but will vary in density based on hydrocarbon components within the single phase. To evaluate the fluid flow, density of the fluid flow can be measured, calculated, and iteratively compared in the manner described to determine the composition of the flow within an acceptable error range. The density of the dense phase can be measured, for example, using a system similar to that shown in FIG. 5, wherein the momentum of the fluid flow is determined using a DP meter, and the velocity of the fluid flow is determined using the SONAR fluid flow meter, and the density is solved using those values. This type of system takes advantage of the fact that the difference in pressure (i.e., the "DP") is proportional to the density of the flow mix times the velocity of the flow mix squared (i.e., $DP \approx \rho_{mix} v^2_{mix}$), and that the flow velocity determined by the SONAR flow meter is proportional to the velocity of the mix $$\left( \text{i.e.,} \quad V_{SONAR} \approx v_{mix}; \rho_{mix} \approx \frac{DP}{V^2_{SONAR}} \right)$$

Figure 7:
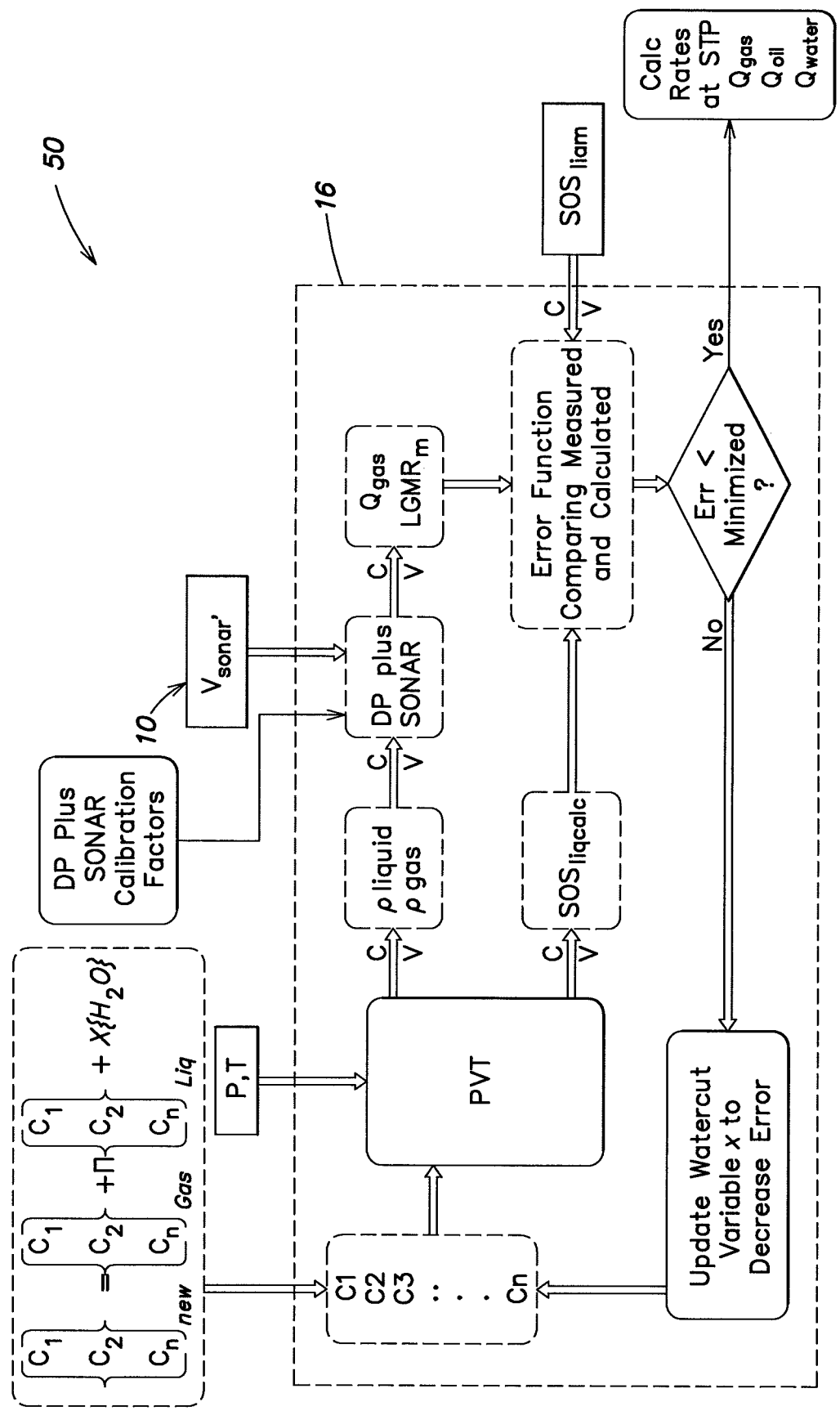
FIG. 7 is a block diagram that diagrammatically illustrates a flow chart of the input, operation, and output of an embodiment of the present invention monitoring system and method.

The density of the dense phase could alternatively be determined using a system like that shown in FIG. 7, using either SONAR flow meter or a independent SOS sensor to measure the SOS of the fluid flow, and use the measured SOS value to determine the density of the fluid flow. In both embodiments, the equation of state model within the processor provides the calculated density of the fluid flow given fluid flow composition data values and pressure and temperature values.

Figure 6:
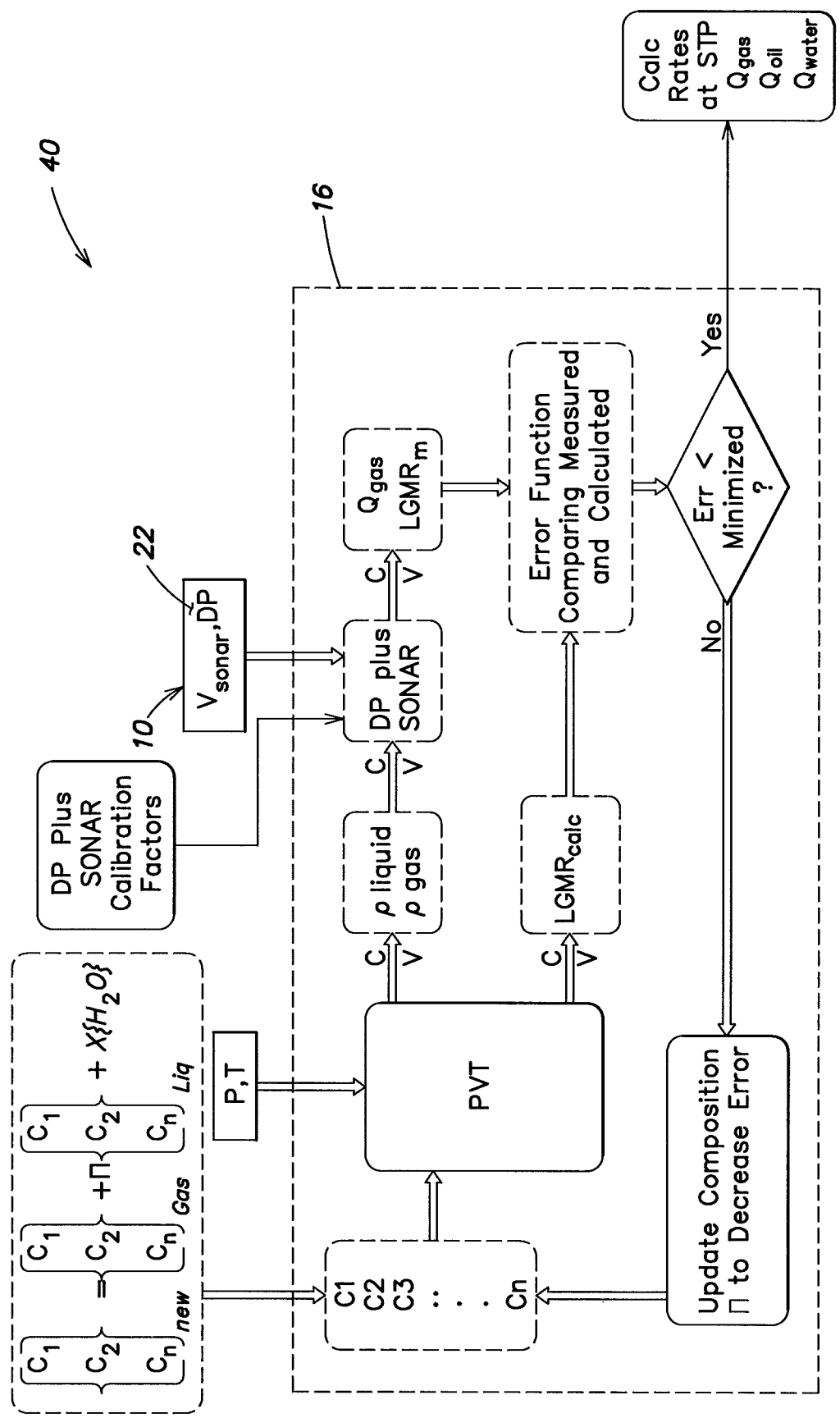
FIG. 6 is a block diagram that diagrammatically illustrates a flow chart of the input, operation, and output of an embodiment of the present invention monitoring system and method.

In a third embodiment 40 of the system, which is diagrammatically shown in FIG. 6, the present monitoring system 40 is configured to be operable for a three phase fluid: gas, hydrocarbon liquid (e.g., oil), and water. The aforesaid system 40 may also be described in terms of a method for monitoring a multiphase fluid flow 11. In this embodiment, the processor 16 is adapted to receive: 1) an initial set of hydrocarbon composition values; 2) a watercut value; 3) flow pressure data (e.g., a flow pressure value from a pressure sensor); 4) flow temperature data (e.g., a flow temperature value from a temperature sensor); and 5) flow velocity data from the SONAR flow meter 10; and 6) flow velocity data from the DP flow meter 22. Here again, the processor 16 may also receive calibration data for one or both flowmeters 10,22. With the received inputs from the flowmeters 10,22, the processor 16 calculates a "measured" fluid flow parameter value (e.g., a measured LGMR) as described above. The processor 16 also determines "calculated" values for the fluid flow parameter (e.g., a "calculated" LGMR), given the input pressure and temperature values. The calculated fluid flow parameter is then compared to the measured fluid flow parameter and an error function evaluates any difference between the respective values. If the error value is within an acceptable range of values (or greater/less than a threshold value), phase flow rates (e.g., at standard temperature and pressure) are determined and reported.

If the error value is outside the acceptable range of values (or less/greater than a threshold value), the processor 16 is adapted to produce a modified set of hydrocarbon composition values for the fluid flow 11, and iteratively repeat the process until the error function is satisfied and the flow rates are reported.

In a fourth embodiment 50 of the system, which is diagrammatically shown in FIG. 7, the present monitoring system 50 (and method) is configured to be operable for a three phase fluid: gas, hydrocarbon liquid (e.g., oil), and water. In this embodiment, the processor 16 is adapted to receive: 1) a set of hydrocarbon composition values; 2) an initial watercut value; 3) flow pressure data; 4) flow temperature data; 5) flow velocity data from the SONAR flowmeter 10; and 6) a measured continuous speed of sound (SOS) value for the liquid phase within the fluid flow 11. With the received pressure and temperature values and the given hydrocarbon composition values, the processor 16 determines a "calculated" SOS fluid flow parameter value. In this embodiment, the system further includes a sensor operable to measure the SOS of the fluid flow; e.g., an ultrasonic sensor operable to measure a time of flight "TOF" signal across the fluid flow. The calculated SOS is then compared to the measured SOS and an error function evaluates any difference between the respective values. If the error value is within an acceptable range of values, phase flow rates (e.g., at standard temperature and pressure) are determined and reported. If the error value is outside the acceptable range of values, the processor 16 is adapted to produce a modified watercut value for the fluid flow 11 and the process is iteratively repeated. For example, using the above-described example as a basis, the modified set could be created by holding "H" constant and varying "$\chi$" in the following equation:

$$\begin{Bmatrix} c_1 \\ c_2 \\ c_n \end{Bmatrix}_{new} = \begin{Bmatrix} c_1 \\ c_2 \\ c_n \end{Bmatrix}_{gas} + \Pi \begin{Bmatrix} c_1 \\ c_2 \\ c_n \end{Bmatrix}_{liq} + \chi H_2O \quad \text{(Eqn. 2)}$$

where "$\chi$" is a variable that can be iteratively adjusted to alter the watercut (i.e., "$H_2O$") contribution and thereby improve the agreement between the measured values and the calculated values. As indicated above, the processor 16 is adapted to iteratively repeat the process until the error function is satisfied and the flow rates are reported.

Figure 8:
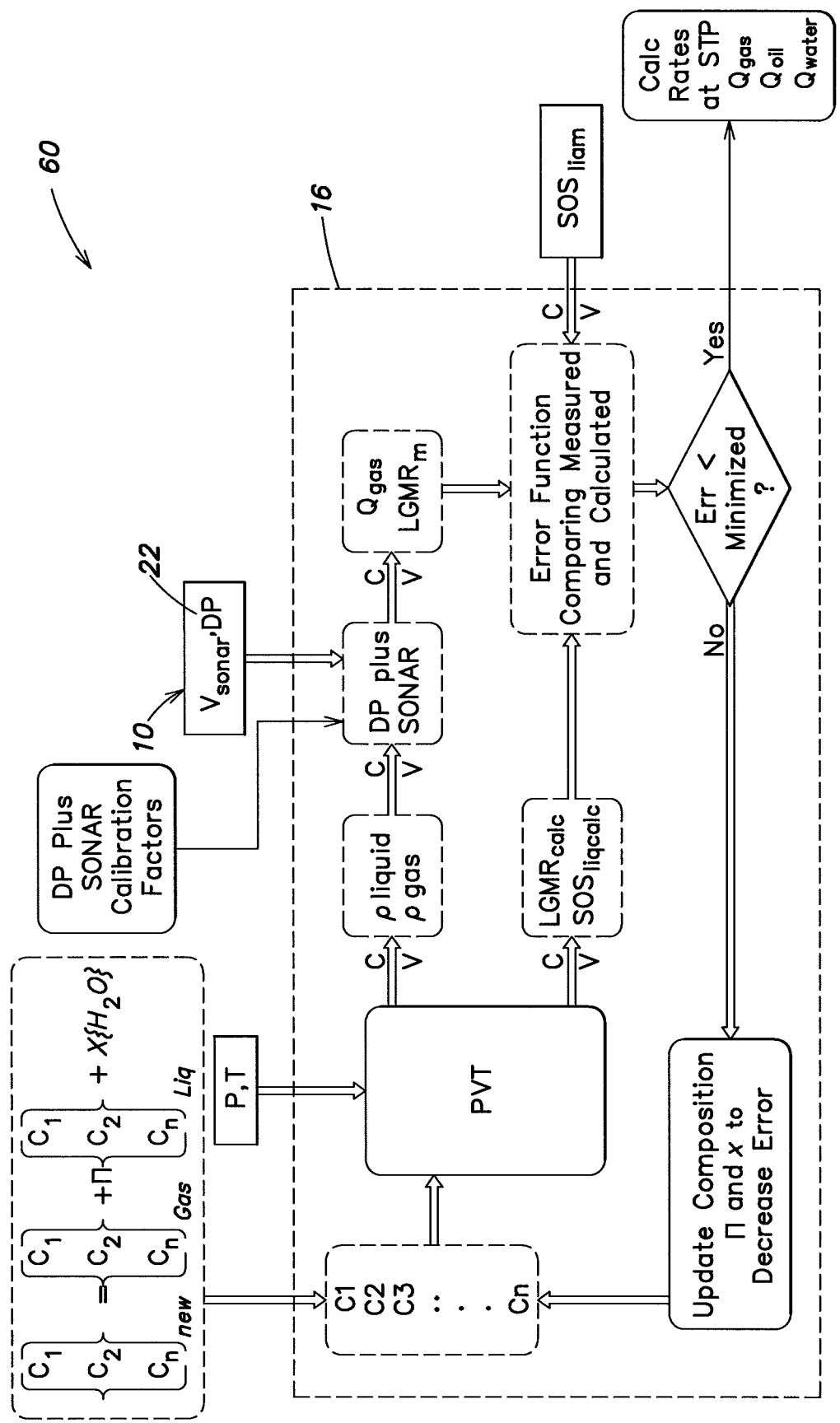
FIG. 8 is a block diagram that diagrammatically illustrates a flow chart of the input, operation, and output of an embodiment of the present invention monitoring system and method.

A fifth embodiment 60 of the present monitoring system, which is diagrammatically shown in FIG. 8, can also be used for monitoring a three phase fluid, containing gas, hydrocarbon liquid, and water. This system embodiment 60 can be used in applications where neither the composition values for the hydrocarbon components of the fluid flow 11 nor the watercut value is known. In this embodiment, the processor 16 is adapted to receive inputs similar to those received in the third and fourth embodiments: e.g., 1) an initial set of hydrocarbon composition values; 2) an initial watercut value; 3) flow pressure data; 4) flow temperature data; 5) flow velocity data from the SONAR flow meter 10; 6) flow velocity data from the DP flow meter 22; and 7) a measured continuous speed of sound (SOS) value for the liquid phase within the fluid flow 11. In some embodiments, the processor is adapted to also receive a measured continuous speed of sound (SOS) value for the gas phase within the fluid flow 11. The measured SOS values could, for example, be determined using ultrasonic sensors positioned within liquid and gas legs of the flow 11 after separation to determine a TOF of the respective flow 11. The TOF data could be used subsequently to determine the respective measured phase fraction of the fluid flow 11. Measuring the SOS in a singular multiphase fluid flow is known in the art and the present invention is not limited to any particular technique (e.g., densitometers, etc.). The SOS values for the gas phase of the flow can be used in a manner similar to that described above, wherein a calculated value of the gas SOS is compared to a measured value of the gas SOS, and the gas SOS adjusted to increase the accuracy of the system. Utilizing the gas SOS in the aforesaid iterative manner can provide substantial utility, for example, in those applications wherein the gas phase comprises a plurality of different hydrocarbon constituents (e.g., C1, Methane; C2, Ethane). The SOS can be used to identify which constituents are present.

With the received inputs from the flowmeters 10,22, the processor calculates a "measured" fluid flow parameter value (e.g., a measured LGMR) as described above. The processor also determines a "calculated" value for the fluid flow parameter (e.g., a "calculated" LGMR) and a calculated SOS for the liquid within the fluid flow 11 based on the PVT model, given the input pressure and temperature values. The calculated fluid flow parameter value is then compared to the measured fluid flow parameter value and an error function evaluates any difference between the values. The SOS values can also be evaluated in a similar manner. If the error values are within an acceptable range of values, phase flow rates (e.g., at standard temperature and pressure) for all three phases are determined and reported.

If either of the error values is outside its respective acceptable range of values, the processor 16 is adapted to produce a modified set of hydrocarbon composition values for the fluid flow 11, and a modified watercut value. The modified set of hydrocarbon composition values can be determined by adjusting the "$\Pi$" variable and the modified watercut can be determined by adjusting the "$\chi$" variable (shown in Eqn. 2 above) until acceptable values for each phase contribution are reached.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. A method of determining a volumetric flow rate for a single phase fluid flow passing within a pipe, the method comprising:

measuring a flow pressure value and a flow temperature value for the fluid flow within the pipe;

using a differential pressure (DP) meter to determine a momentum value for the fluid flow;

using a SONAR fluid flow meter to measure a velocity value of the fluid flow;

using a processor to execute stored instructions, the stored instructions including an equation of state model for the fluid flow, wherein the instructions cause the processor to:

(a) determine a measured density value of the fluid flow using the determined momentum value and the measured velocity value;

(b) calculate a density value for the fluid flow, using the measured flow pressure and temperature values, a first set of fluid flow composition values, and the equation of state model;

(c) compare the measured density value and the calculated density value to determine an error value representative of a difference between the measured density value and the calculated density value; and (d) compare the error value to a predetermined condition, and when:

(1) the condition is met use at least one of the measured density value or the calculated density value to determine the volumetric flow rate of the fluid flow; or (2) the condition is not met, the processor is adapted to produce a modified set of fluid flow composition values and iteratively repeat step (a); and (b) using the modified set of fluid flow compositional values, and (c), and (d) until the condition is met.

2. The method of claim 1, wherein the fluid flow composition data values include hydrocarbon components.

3. An apparatus for determining a volumetric flow rate of a single phase fluid flow passing within a pipe, the apparatus comprising:

a differential pressure (DP) meter configured to determine a momentum value for the fluid flow;

a SONAR fluid flow meter configured to determine a velocity value of the fluid flow;

a processor in communication with the DP meter, the SONAR fluid flow meter, and stored instructions that include an equation of state model for the fluid flow, the instructions when executed cause the processor to:

(a) determine a measured density value of the fluid flow using a momentum value determined using the DP meter and a velocity value measured using the SONAR fluid flow meter;

(b) calculate a density value for the fluid flow, using a measured flow pressure, a measured temperature value, a first set of fluid flow composition values, and the equation of state model;

(c) compare the measured density value and the calculated density value to determine an error value representative of a difference between the measured density value and the calculated density value; and (d) compare the error value to a predetermined condition, and when:

(1) the condition is met use at least one of the measured density value or the calculated density value to determine the volumetric flow rate of the fluid flow; or (2) the condition is not met, the processor is adapted to produce a modified set of fluid flow composition values and iteratively repeat step (a); and (b) using the modified set of fluid flow compositional values, and (c), and (d) until the condition is met.

4. The apparatus of claim 3, wherein the fluid flow composition data values include hydrocarbon components.

5. A method of determining a volumetric flow rate for a fluid flow passing within a pipe, the method comprising:

measuring a flow pressure value and a flow temperature value for the fluid flow within the pipe;

using a differential pressure (DP) meter to measure a differential pressure data for the fluid flow;

using a SONAR fluid flow meter to measure a velocity data of the fluid flow;

using a processor to execute stored instructions, the stored instructions including an equation of state model for the fluid flow, wherein the instructions cause the processor to:

(a) determine a measured liquid gas mass ratio (LGMR) value for the fluid flow, using the measured flow pressure and temperature values, the differential pressure data, the velocity data, and a first set of fluid flow composition values;

(b) determine a calculated LGMR value for the fluid flow, using the measured flow pressure and temperature values, the equation of state model, and the first set of fluid flow composition values;

(c) compare the measured LGMR value and the calculated LGMR value to determine an error value representative of a difference between the measured LGMR value and the calculated LGMR value; and (d) compare the error value to a predetermined condition, and when:

(1) the condition is met use at least one of the measured LGMR value or the calculated LGMR value to determine the volumetric flow rate of the fluid flow; or (2) the condition is not met, the processor is adapted to produce a modified set of fluid flow composition values and iteratively repeat step (a); and (b) using the modified set of fluid flow compositional values, and (c), and (d) until the condition is met.

6. The method of claim 5, wherein the fluid flow composition data values include hydrocarbon components.

* * * * *